United States Patent [19]

Melashenko et al.

[11] Patent Number: 5,743,404
[45] Date of Patent: Apr. 28, 1998

[54] COATED CONTAINER

[76] Inventors: Connie Melashenko; Robert Melashenko, both of 1673 Dwight St., Redlands, Calif. 92373

[21] Appl. No.: 619,007

[22] Filed: Mar. 21, 1996

[51] Int. Cl.⁶ .................... A63H 33/30; A23L 1/27; A47G 35/00
[52] U.S. Cl. .................... 206/524.3; 206/457; 206/575; 426/104; 426/300; 426/540; 428/15; 428/542.2; 446/76
[58] Field of Search .................... 446/76; 428/15, 428/16, 542.2; 206/575, 457, 524.3; 220/4.21, 4.25; 426/250, 298, 300, 104, 540; 118/13, 14

[56] References Cited

U.S. PATENT DOCUMENTS

| | | | |
|---|---|---|---|
| 591,109 | 10/1897 | Clark | 428/15 X |
| 1,382,601 | 6/1921 | Cressey | 426/104 |
| 1,383,290 | 7/1921 | Cressey | 426/104 X |
| 1,383,838 | 7/1921 | Mrazek | 206/457 X |
| 1,388,094 | 8/1921 | Buttigieg | |
| 1,829,689 | 10/1931 | Townley et al. | 426/300 X |
| 1,935,901 | 11/1933 | Augenblich | 426/540 X |
| 2,535,538 | 12/1950 | Koch | 426/540 X |
| 2,593,566 | 1/1952 | Kemp | 426/300 X |
| 2,903,819 | 9/1959 | Barber et al. | 428/15 X |
| 2,909,304 | 7/1959 | Powell | |
| 2,998,896 | 9/1961 | Ker | 220/4.26 |
| 3,292,840 | 12/1966 | Schmidt | |
| 3,341,396 | 9/1967 | Iverson | 428/15 X |
| 4,124,135 | 11/1978 | Weder et al. | |
| 4,693,205 | 9/1987 | Thill | 426/300 X |
| 5,074,239 | 12/1991 | Law | 206/575 X |

*Primary Examiner*—Byron P. Gehman
*Attorney, Agent, or Firm*—Fish & Richardson P.C., P.A.

[57] ABSTRACT

A container is presented having a hollow substrate with a coating covering at least a portion of the substrate. The coating includes a mixture of a base material and an adhesive where the base material is absorbent with respect to nontoxic dyes such as food coloring. One preferred base material includes rice powder. The substrate can be egg shaped, so that the coated container forms a synthetic Easter egg that can be colored with food coloring.

19 Claims, 1 Drawing Sheet

5,743,404

1
COATED CONTAINER

BACKGROUND OF THE INVENTION

The invention relates to a coated container that can be decorated with nontoxic dyes.

A tradition surrounding the Christian celebration of Easter involves the decoration of eggs, especially hard boiled eggs. The decoration of the eggs usually involves the coloring of the eggs with food colorings or comparable nontoxic dyes. The eggs are sometimes hidden to make a game of finding the colored eggs. The process of decorating the eggs itself often can provide entertainment.

The tradition of Easter eggs has broadened to involve the giving of egg shaped candy and the gift of other candy and gifts sometimes within a plastic egg. Gifts for all occasions typically are packaged within containers to heighten the surprise of the receiver and add drama to the presentation. The package is often decorated for the occasion.

SUMMARY OF THE INVENTION

One aspect of the invention involves a container including (a) a hollow substrate and (b) a coating adhered to at least a portion of the substrate, where the coating comprises a mixture of a base material and an adhesive with the base material being absorbent with respect to nontoxic dyes. In preferred embodiments, the hollow substrate is egg shaped or round. In other preferred embodiments the coating forms a seamless layer over the substrate. Preferred materials for the hollow substrate include plastics, especially styrofoam, and paper mache.

In other preferred embodiments, the base material includes a finely ground rice material. The coating has an outer surface, and the outer surface of the coating preferably has a higher concentration of the rice material relative to the overall concentration in the coating. Preferred non-toxic dyes include food coloring. In other preferred embodiments, the adhesive includes a latex paint or an acrylic paint.

Another aspect of the invention includes a method of producing a container including the step of coating a hollow substrate with a coating material where the coating material has a mixture of a base material and an adhesive with the base material being absorbent with respect to nontoxic dyes. The base material preferably includes finely ground rice material. The coating preferably includes a higher concentration of base material at the surface of said coating. The adhesive preferably includes a latex paint.

Another aspect of the invention involves a kit including (a) a hollow substrate that opens to permit the placement of an object within; and (b) coating material for application to the outside of the hollow substrate, where the coating material includes a base material and an adhesive with the base material being absorbent with respect to nontoxic dyes.

DETAILED DESCRIPTION OF THE INVENTION

The coated container can have the capability of holding any appropriately small object. Typically, but not necessarily, the object will be a gift. Furthermore, the coated container can be decorated similar to the way that Easter Eggs are traditionally decorated. The coating provides the appropriate surface for the decoration.

The container can be used for Easter or any other occasion. Real eggs do not have to be wasted in order to color "eggs" if there is no desire to eat the hard boiled eggs. The coated container provides entertainment through the decoration as well as the ability to hold an object in secret until the container is opened. The coated container does not have to carry an object, and its entire purpose might be in the entertainment provided by decorating the container.

Figure 1:
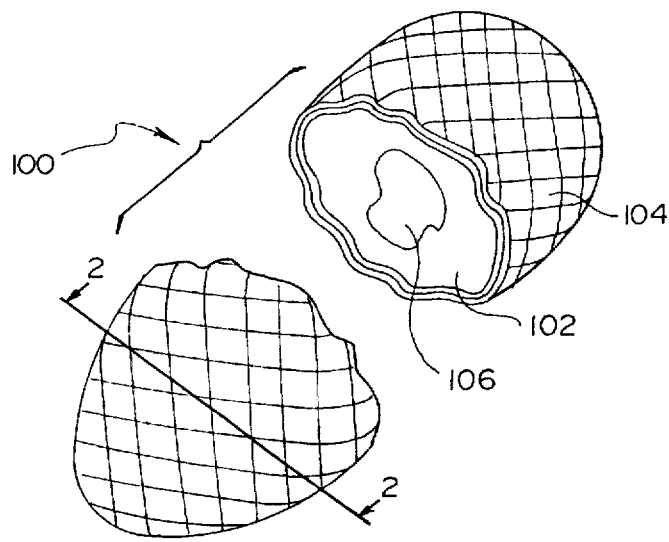
FIG. 1 is an exploded perspective view of a coated container exposing the inside of the container.
Figure 2:
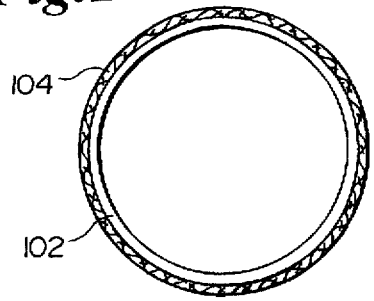
FIG. 2 is a sectional view taken along lines 2—2 of FIG. 1.

Referring to FIGS. 1 and 2, the coated container 100 includes a hollow substrate 102 and a coating 104. The hollow substrate 102 can come in a variety of shapes. Preferred shapes include round and egg shapes. The substrate 102 can be made from a variety of materials or combinations of materials. Preferred materials include plastics, especially styrofoam, and paper mache. Preferred hollow substrates include commercially available plastic eggs which separate into two halves.

While the size of the substrate 102 is not important, a preferred substrate 102 would fit within a person's hand. The substrate 102 may or may not separate into two or more pieces. If the substrate 102 does not separate into two pieces, any object would have to be placed within the substrate during the manufacturing process. Substrates 102 that separate are preferred since the user could then add the selected object within the container 100.

An object 106 optionally can be placed within the substrate 102. The object 106 can be a toy, candy or a small gift, such as jewelry. The object 106 basically can be anything that will fit within the substrate 102. The object 106 may or may not be wrapped separately before placement within the substrate 102. Additional padding or filler optionally can be added to the inside of the substrate 102 whether or not the substrate 102 also contains an object 106.

Figure 3:
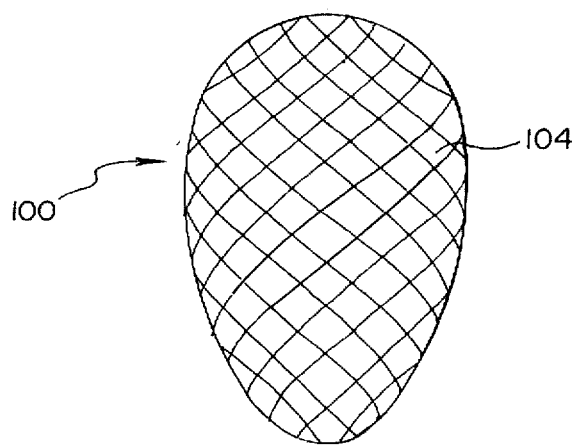
FIG. 3 is a front view of the coated container.

The coating 104 is applied to at least a portion of the surface of the substrate 102. Preferably, the coating 104 covers the entire outer surface of the substrate 104 to form a seamless layer, as shown in FIG. 3. The coating 104 provides an absorbent material to the outer portion of the gift holder 100. The coating 104 is used to reproduce approximately the properties of a natural egg shell in terms of providing a surface that can be decorated in a variety of ways including using food colorings such as those found in Easter Egg colors. Specifically, a preferred coating 104 should absorb Easter Egg dyes or comparable food coloring.

The coating includes a mixture of a base material and an adhesive. Appropriate base materials include absorbent, powdered organic substances such as grains (for example, flour), cellulose (for example, cotton powder), sugar, silica, hops and combinations thereof. The base material should absorb non-toxic dyes, such as food colorings, when the dyes are applied as an aqueous solution. One preferred coating base material uses a finely ground rice material, such as rice powder. The size of the powder particles is not critical except that powder should be fine enough to provide a desired texture to the final coating.

The base material is adhered by an adhesive that provides appropriate adhesion to the substrate surface. Appropriate adhesives include latex paints and acrylic paints. The adhesive should be non-toxic, insoluble in water, and capable of adhering the base material to the substrate. Latex paint is a preferred adhesive because it imparts water resistance to the coating which assists in keeping the inside of the container dry when the container is dipped into a dye solution. Preferred coatings form a relatively hard surface approximating the surface of a natural egg.

The base material can be approximately uniformly distributed in the coating. In other embodiments, the outer surface of the coating will have additional base material to facilitate with the coloring process. The inner portion of the coating can be pure adhesive. In summary, the mixture of base material and adhesive need not be homogenous. The adhesive generally will not absorb appreciable quantities of the non-toxic dyes without the base material.

In preparing the coated container 100, the substrate 102, optionally containing a object 106, is provided. In addition, the coating material is prepared for application. Preparation of the coating material may involve the mixing of the base material and the adhesive prior to application. The initially wet coating material then is applied to the outer surface of the substrate. The consistency of the wet coating material preferably is suitable for easy application at the appropriate thickness. Additional base material optionally can applied over the wet coating mixture.

Alternatively, the base material and the adhesive can be applied sequentially. In this embodiment, the adhesive is applied in a thin coating on the substrate. The powdered base material is applied to the wet adhesive. In either embodiment, the coating 104 is allowed to dry after the desired amount of base material is applied. Excessive base material can be shaken off either during or after drying. The coated container 100 is then ready for decoration, as desired, using nontoxic dyes and other appropriate decorations.

Further excess powder can be removed with fine sandpaper, wool brushes or the like to smooth the coating of the product. The above methods can be adapted to automated manufacturing methods.

What is claimed is:

1. A container comprising:
   (a) a hollow-substrate; and
   (b) a dried coating adhered to at least a portion of said substrate, where said coating comprises a mixture of a base material and an adhesive, with said dried coating being absorbent with respect to nontoxic dyes.

2. The container of claim 1, wherein said hollow substrate is egg shaped.

3. The container of claim 1, wherein said hollow substrate is round.

4. The container of claim 1, wherein said coating forms a seamless layer.

5. The container of claim 1, wherein said hollow substrate comprises a plastic.

6. The container of claim 1, wherein said hollow substrate comprises paper mache.

7. The container of claim 1, wherein said hollow substrate comprises styrofoam.

8. The container of claim 1, wherein said base material comprises a finely ground rice material.

9. The container of claim 8, wherein said coating has an outer surface and said outer surface of said coating has further rice material in addition to any rice material found at said outer surface due to mixing rice material throughout said adhesive.

10. The container of claim 8, wherein said non-toxic dyes comprise food coloring.

11. The container of claim 1, wherein said adhesive comprises a latex paint.

12. The container of claim 1, wherein said adhesive comprises an acrylic paint.

13. A method of producing a container comprising the step of coating a hollow substrate with a coating material where said coating material comprises a mixture of a base material and an adhesive, with said coating material being absorbent with respect to nontoxic dyes when dried.

14. The method of claim 13, wherein said base material is a finely ground rice material.

15. The method of claim 13, wherein said coating comprises further base material at the surface of said coating in addition to any base material found at said surface due to mixing base material throughout said adhesive.

16. A kit comprising:
   (a) a hollow substrate that opens to permit the placement of an object within; and
   (b) coating material for application to the outside of the hollow substrate, said coating material comprising a base material and an adhesive with said coating material being absorbent with respect to nontoxic dyes when dried, following application to said hollow substrate.

17. The kit of claim 16, wherein said base material comprises a finely ground rice material.

18. The kit of claim 16, wherein said non-toxic dyes comprise food coloring.

19. The kit of claim 16, wherein said adhesive comprises a latex paint.

* * * * *